US009669890B2

(12) United States Patent
Chen

(10) Patent No.: US 9,669,890 B2
(45) Date of Patent: Jun. 6, 2017

(54) BICYCLE FRAME ASSEMBLY

(71) Applicant: GIANT (KUNSHAN) CO., LTD., Kunshan (CN)

(72) Inventor: Jack Chen, Taichung (TW)

(73) Assignee: GIANT (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 14/298,546

(22) Filed: Jun. 6, 2014

(65) Prior Publication Data

US 2014/0361509 A1    Dec. 11, 2014

(30) Foreign Application Priority Data

Jun. 7, 2013   (CN) .......................... 2013 2 0326778

(51) Int. Cl.
  *B62J 11/00*  (2006.01)
  *B62K 19/40*  (2006.01)

(52) U.S. Cl.
  CPC .............. *B62J 11/00* (2013.01); *B62K 19/40* (2013.01)

(58) Field of Classification Search
  CPC ... B62J 9/005; B62J 1/14; B62J 11/00; B62K 3/02; B62K 19/40
  USPC ........... 280/202, 274, 281.1, 288.4; 224/414, 224/425, 426, 430, 440, 447, 926
  See application file for complete search history.

(56) References Cited

U.S. PATENT DOCUMENTS

| | | | | | |
|---|---|---|---|---|---|
| 637,382 | A | * | 11/1899 | Bartlett | 172/354 |
| 780,175 | A | * | 1/1905 | Hedstrom | 280/202 |
| 1,050,311 | A | * | 1/1913 | Steinberg | 280/202 |
| 1,109,230 | A | * | 9/1914 | Johns | 280/202 |
| 1,137,583 | A | * | 4/1915 | Cox | 248/311.2 |
| 4,570,835 | A | * | 2/1986 | Criqui et al. | 224/414 |
| 4,955,516 | A | * | 9/1990 | Satterfield | 224/414 |
| 5,468,006 | A | * | 11/1995 | Delserro | 280/202 |
| 5,803,328 | A | * | 9/1998 | Nakahara | 224/420 |
| D573,011 | S | * | 7/2008 | Decker et al. | D8/380 |
| 2011/0233222 | A1 | | 9/2011 | Bethlenfalvy | |
| 2012/0037677 | A1 | * | 2/2012 | Valiquette | 224/414 |
| 2013/0126569 | A1 | * | 5/2013 | Huang | 224/414 |

* cited by examiner

*Primary Examiner* — Anne Marie Boehler
(74) *Attorney, Agent, or Firm* — Muncy, Geissler, Olds & Lowe, P.C.

(57) ABSTRACT

A bicycle frame assembly is formed of a head tube, a seat tube, a linking member, and a support holder. The linking member includes a first part, two second parts, and two positioning parts. The first part is connected with the seat tube. The two positioning parts are spaced from each other and extend in an interval toward the head tube from the first part to jointly form a limiting portion therebetween. The two second parts are connected with the head tube and located between the head tube and the two positioning parts. The support holder is movably mounted to the limiting portion relative to the linking member for accommodating a portable part or accessory. Therefore, the present invention facilitates that the rider can take or put the portable part or accessory from or into the support holder with his or her natural riding posture.

7 Claims, 6 Drawing Sheets

BICYCLE FRAME ASSEMBLY

BACKGROUND OF THE INVENTION

1. Field of the Invention

The present invention relates generally to a bicycle frame and more particularly, to a bicycle frame assembly allowing a user to conveniently take or put a portable spare part or a portable accessory therefrom or thereto.

2. Description of the Related Art

There are a variety of spare parts and accessories for a bicycle. To make the spare parts and accessories combined with the bicycle, a carrier is usually additionally mounted to the bicycle frame for carrying portable spare parts and accessories. For example, a common bicycle water bottle is usually detachably placed at a bottle carrier mounted to the seat tube or the down tube of the bicycle frame, so the user can put or take the water bottle into or from the bicycle frame.

When the user intends to drink water from the aforesaid water bottle, the user needs to bow his or her waist to reach the water bottle and then take the water bottle in a predetermined manner from the bottle carrier. After the user completes the drinking, the user needs to bow his or her waist again to put the water bottle back to the bottle carrier. In this way, the user takes or puts the water bottle from or into the bottle carrier with a very unbalanced and dangerous posture. For this reason, U.S. Pat. Pub. No. 2011/0233222 disclosed an accessory holder mounted straight to a top tube of a bicycle for allowing the user to take or put a portable part or accessory therefrom or therein.

The aforesaid accessory holder is mounted to partially bent portions of two top tubes and fixedly interconnected with the top tubes, so the height that the accessory holder can hold relative to the top tubes cannot be adjusted. If a portable accessory having a predetermined height, such as a water bottle, is to be put into the accessory holder, the water bottle could only have its bottom side placed at the accessory holder. However, when the bicycle is running, if the water bottle is too high, the water bottle will be subject to disengagement from the accessory holder due to bumpy road and vibration and will fails to be firmly positioned to the accessory holder. On the contrary, if the water bottle is too low, the user will fail to reach the water bottle.

SUMMARY OF THE INVENTION

The primary objective of the present invention is to provide a bicycle frame assembly which allows a rider to take or put a portable part and accessory therefrom or therein with a natural riding posture and which enhances the positioning stability and operational safety of the portable part or accessory.

The foregoing objective of the present invention is attained by the bicycle frame assembly formed of a head tube, a seat tube, a linking member, and a support holder. The head tube is adapted for a front fork to be mounted thereto. The seat tube is adapted for a saddle to be mounted thereto. The linking member includes a first part, two second parts, and two positioning parts. The first part is connected with the seat tube. The two positioning parts are spaced from each other and extend in an interval toward the head tube from the first part to jointly form a limiting portion therebetween. The two second parts are connected with the head tube and located between the head tube and the two positioning parts. The support holder is movably mounted to the limiting portion relative to the linking member for accommodating a portable part or accessory. In light of this structure, the present invention facilitates that the rider can take or put the portable part or accessory from or into the support holder with his or her natural riding posture.

In a preferred embodiment, the support holder includes a fastening member and a positioning member and is movably mounted to the limiting portion via a fastening piece. The fastening piece includes a slide slot and mounted to the first part and adjacent to the limiting portion. The fastening member abuts against the fastening piece. The positioning member is inserted into the slide slot. The support holder is movable along the slide slot via the positioning member and the positioning member holds the fastening member. In this way, the angle and position of the support holder can be adjusted relative to the linking member to enhance the operational stability and safety.

In a preferred embodiment, the support holder integrally includes two top arc-shaped portions, two first standing portions, two middle arc-shaped portions, two second standing portions, and two bottom portions. Each of the two first standing portions is located between the top arc-shaped portion and the middle arc-shaped portion. Each of the second standing portions is located between the middle arc-shaped portion and the bottom portion. The two top arc-shaped portions and the two middle arc-shaped portions jointly define an accommodating space therebetween having a predetermined height.

In a preferred embodiment, the two positioning parts are different from the two second parts in orientation, so the angle or position that the two second parts are soldered to the head tube can be adjusted for higher soldering quality as per requirement.

DETAILED DESCRIPTION OF PREFERRED EMBODIMENTS

Structural features and desired effects of the present invention will become more fully understood by reference to the following preferred embodiments given hereunder. Please note that a bicycle frame assembly of the present invention indicates either of models or sizes of a variety of bicycles, e.g. leisure bicycle models or racing bicycle models, bicycles for children or adults, so these embodiments are given by way of illustration only and not limitative of the claim scope of the present invention. In addition, the directional terms "front", "up", "middle", "down", "rear", "top", and "bottom" as mentioned in the following paragraphs are based on the normal forward direction of a common bicycle and the operational direction of a rider and however, they are not limitative of the claim scope of the present invention. Furthermore, the bicycle frame assembly of the present invention is formed of bars or tubes made of a predetermined material which can be one selected from a variety of materials.

Figure 1:
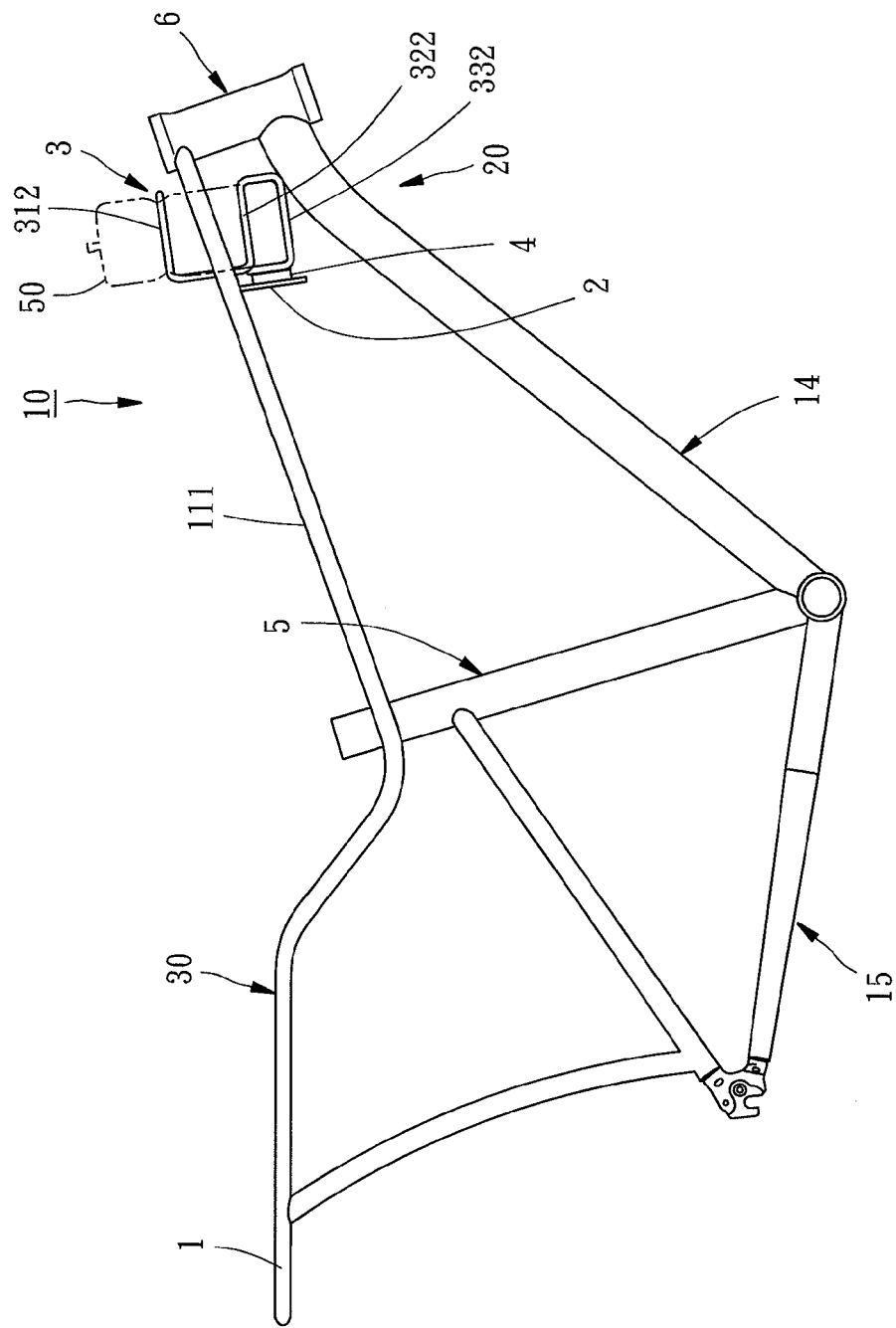
FIG. 1 is a front view of a first preferred embodiment of the present invention.
Figure 2:
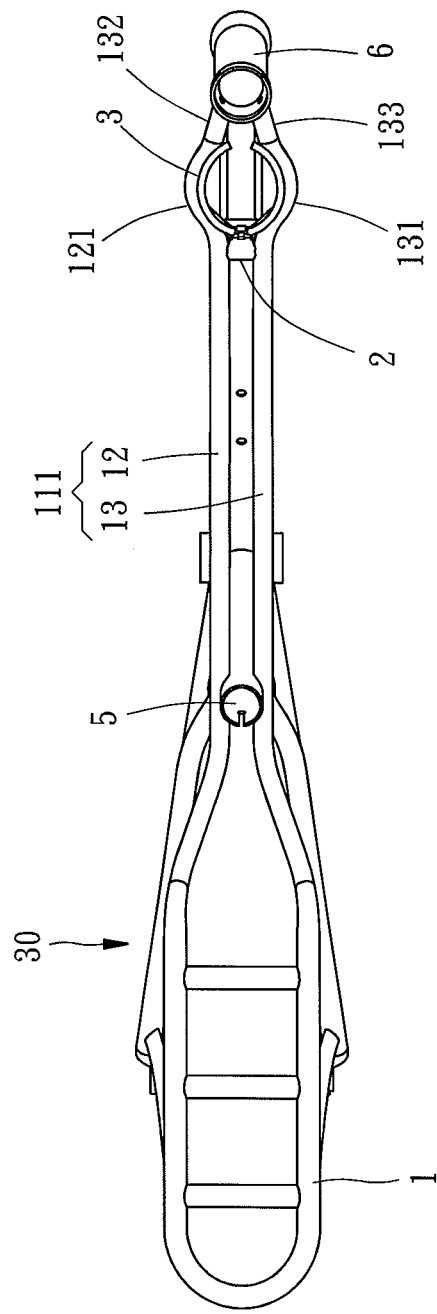
FIG. 2 is a top view of the first preferred embodiment of the present invention.
Figure 3:
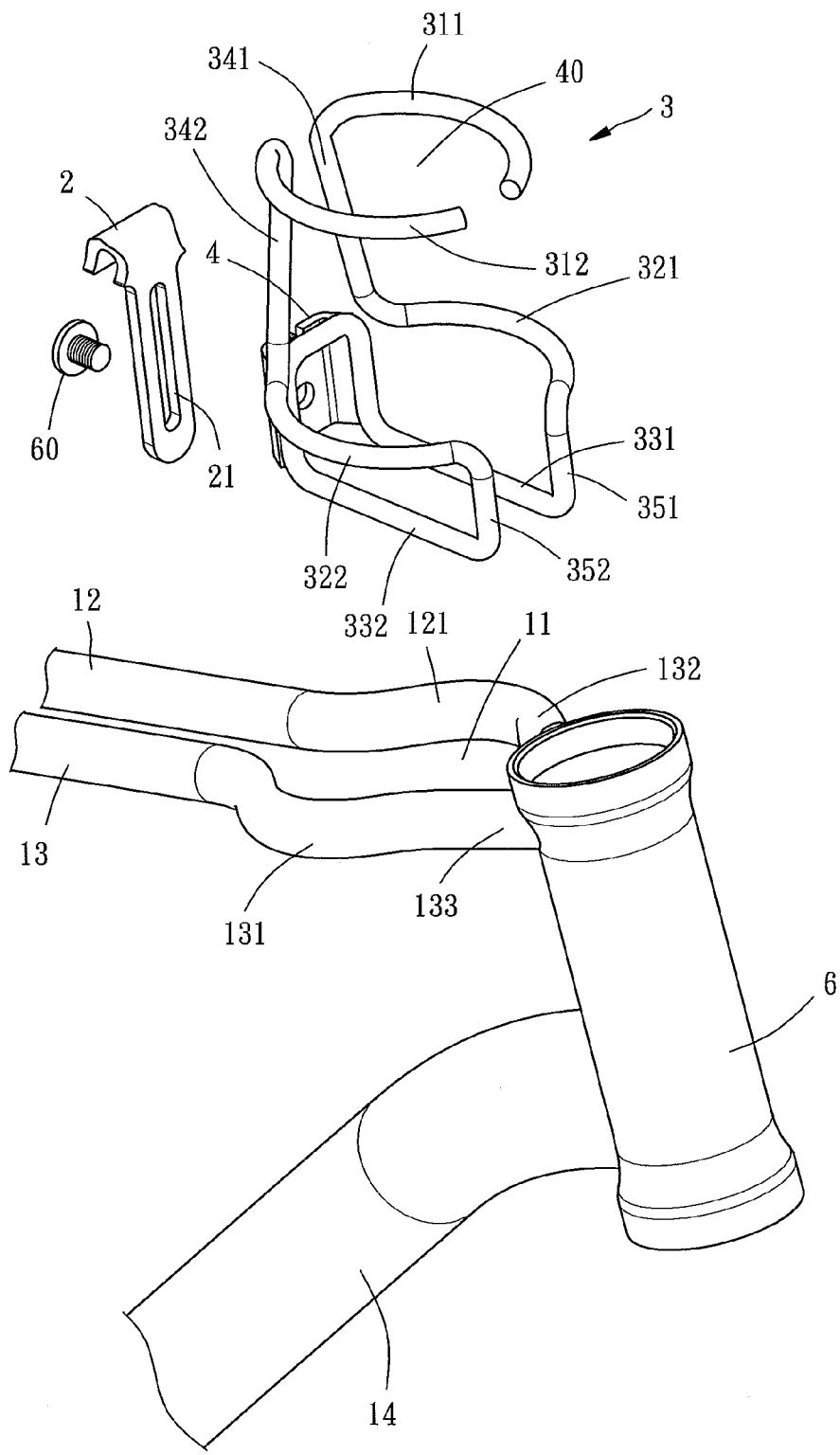
FIG. 3 is a partially exploded view of the first preferred embodiment of the present invention.
Figure 4:
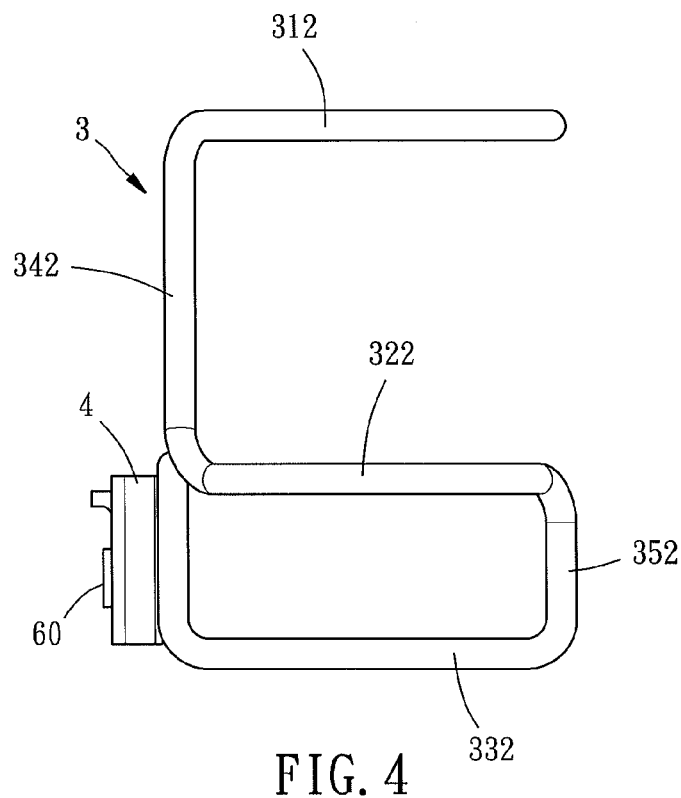
FIG. 4 is a front view of a support holder in accordance with the first preferred embodiment of the present invention.
Figure 5:
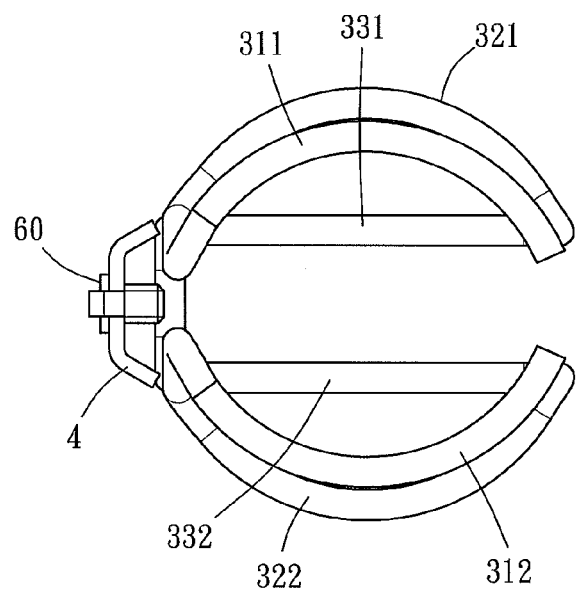
FIG. 5 is a top view of the support holder in accordance with the first preferred embodiment of the present invention.
Figure 6:
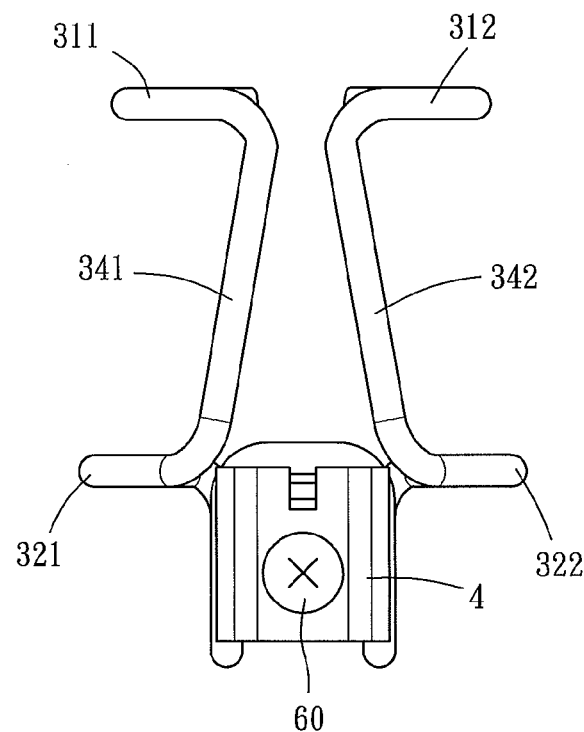
FIG. 6 is a left view of the support holder in accordance with the first preferred embodiment of the present invention.

Referring to FIGS. 1-3, a bicycle frame assembly 10 constructed according a first preferred embodiment of the present invention is formed of a main frame 20 and a support holder 3. The main frame 20 includes a head tube 6, a seat tube 5, a down tube 14, a chain stay 15, and a linking member 30. The down tube 14 is located between the head tube 6 and the seat tube 5. The chain stay 15 is located behind the seat tube 5. The head tube 6 is for mounting a front fork thereto. The seat tube 5 is for mounting a saddle thereto. The detailed descriptions and operations of these elements as well as their interrelations are recited in the respective paragraphs as follows.

Figure 9:
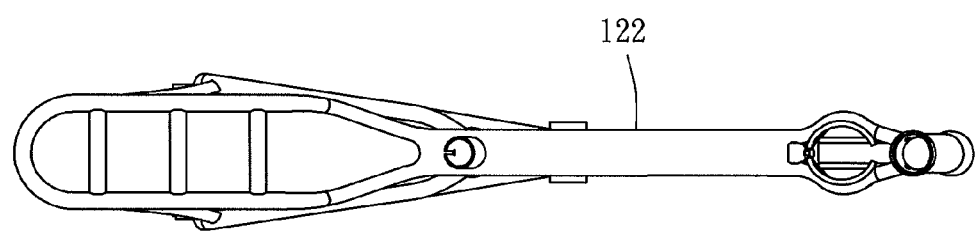
FIG. 9 illustrates another embodiment of a first part of the present invention.

The linking member 30 is formed of one single metallic tube processed by curvature or made of a composite fibrous material by molding. The linking member 30 includes a first part 111, two positioning parts 121 and 131, and two second parts 132 and 133. In this embodiment, the first part 111 is formed of two parallel top tubes 12 and 13 spaced from each other as an example. However, the first part 111 can be formed of one single tube structurally as shown in FIG. 9. The two positioning parts 121 and 131 are located at one of two ends of the linking member 30 and between the first and second parts 111, 132, 133. A rear support tube 1 is integrally formed at the other end of the linking member 30. The linking member 30 is located at an upper side of the main frame 20. The two top tubes 12 and 13 of the first part 111 are apposed between the head tube 6 and the seat tube 5. The rear support tube 1 extends toward a rear side of the seat tube 5.

Each of the top tubes 12 and 13 of the first part 111 is tubular in shape. The two top tubes 12 and 13 are jointly soldered to an external side of the seat tube 5 at a predetermined angle defined between respective axial directions of the two top tubes 12 and 13. Each of the positioning parts 121 and 131 is arc-shaped, protruding outward from the main frame 20. A hollow limiting portion 11 is formed between the two positioning parts 121 and 131. The limiting portion 11 is adjacent to the head tube 6. The second parts 132 and 133 are different the positioning parts 121 and 131 in orientation, so end portions the second parts 132 and 133 are soldered to an external surface of the head tube 6.

Referring to FIGS. 3-6, the support holder 3 is formed of a one-piece metallic bar and includes two top arc-shaped portions 311 and 312, two first standing portions 341 and 342, two middle arc-shaped portions 321 and 322, two second standing portions 351 and 352, and two bottom portions 331 and 332. The two first standing portions 341 and 342 are located between the top arc-shaped portions 311 and 312 and the middle arc-shaped portions 321 and 322. An accommodating space 40 having a predetermined height is defined between the top arc-shaped portions 311 and 312 and the middle arc-shaped portions 321 and 322. In this way, when a portable part or accessory having a predetermined height, e.g. a water bottle 50, is mounted to the support holder 3, as shown in FIG. 1, the top arc-shaped portions 311 and 312 and the middle arc-shaped portions 321 and 322 can hold the water bottle 50 and the bottom portions 331 and 332 support the water bottle 50. A fastening member 4 is mounted to end portions of the two bottom portions 321 and 322 for mounting a positioning member 60 thereto. In this embodiment, the positioning member 60 is but not limited to a screw bolt and can be either of other mechanical components functioning as fastening.

Referring to FIGS. 1-3 again, the support holder 3 is movably mounted to the limiting portion 11 via a fastening piece 2. The fastening piece 2 is provided with a slide slot 21 and two sides soldered to between the two top tubes 12 and 13 and adjacent to the limiting portion 11. The fastening piece 2 is soldered to the first part 111 for making the support holder 3 fixed to the bicycle frame more firmly and counteract the vibration occurred in the process of cycling. The slide slot 21 is not axially parallel to the top tubes 12 and 13. The fastening member 4 abuts against the fastening piece 2 and the positioning member 60 is inserted into the slide slot 21, so the support holder 3 is movable long the slide slot 21 via the positioning member 60 to move upward or downward in a way that the support holder 3 is not axially parallel to the top tubes 12 and 13. The user can screw on or off the positioning member 60 to conveniently control how much the support holder 3 is fixed, so the user does not need to repeatedly loosen or tighten the support holder 3 from or onto the bicycle frame as the user does so toward a conventional quick-release member, thus making the fastening and adjustment of the support holder 3 more simplified and convenient for more accurate and effective positioning effect.

When the present invention is applied to mounting a portable part or accessory, such as the water bottle 50 having a predetermined height, the water bottle 50 can be inserted into the accommodating space 40, so the upper part and the middle part of the water bottle 50 can be held to the support holder 3 and meanwhile, the water bottle 50 is movable upward and downward unparallel to the top tubes 12 and 13 axially in a way that the support holder 3 is movable along the slide slot 21, thus changing the distance for which the upper part of the water bottle 40 protrudes upward beyond the linking member 30. In this way, the rider can change the center of gravity of the water bottle 50 relative to the linking member 30 to make the water bottle 50 stably positioned to the main frame 20.

The support holder 3 is mounted straight to the two top tubes 12 and 13 and adjacent to the head tube 6 and the rider can take or put the portable part or accessory from or into the support holder 3 with the natural riding posture without bowing his or her waist that leads to unbalanced posture, thus boosting the operational resilience, convenience, and safety of the rider. In addition, the angle and the center of gravity that are defined between the portable part or accessory and the main frame can be adjusted through the support holder 3 to prevent the portable part or accessory from falling off the main frame 20 to further heighten the positioning stability of the portable part or accessory.

Figure 7:
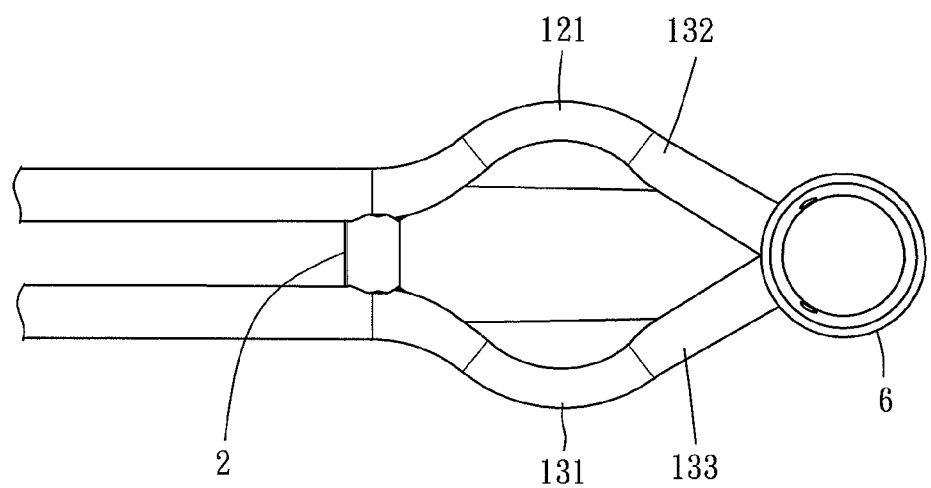
FIG. 7 is a top view of a second preferred embodiment of the present invention.

Because the orientation of the positioning parts 121 and 131 is different from those of the first part 111 and the second part 132 and 133, when the linking member 30 is soldered to the head tube 6, the angle of curvature of the second parts 132 and 133 relative to the positioning parts 121 and 131 can be changed to reinforce the soldering strength of the second parts 132 and 133 and to lessen deformation of the second parts 132 and 133 soldered to the head tube 6. Referring to FIG. 7, end portions of the second parts 132 and 133 can also be interconnected with the head tube 6.

Figure 8:
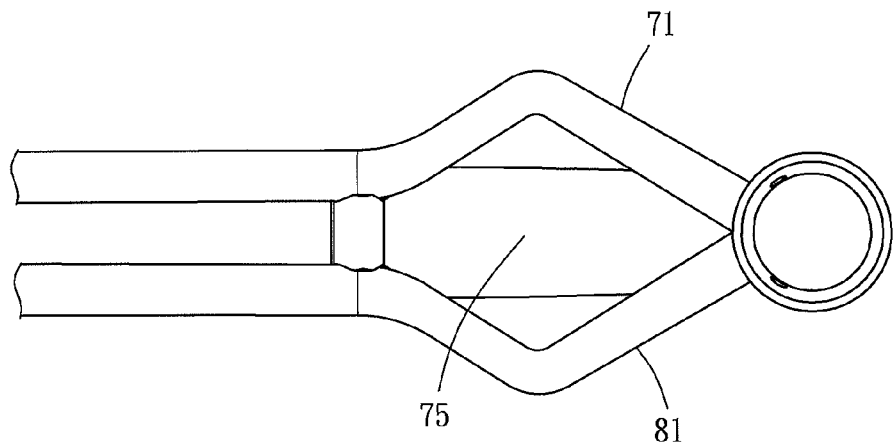
FIG. 8 illustrates another embodiment of positioning parts of the present invention.

In addition, the limiting portion 75 can be polygonal in shape. For example, as shown in FIG. 8, the two positioning parts 71 and 81 are polygonal as long as they can form the limiting portion 75 to reach the objective of the present invention.

What is claimed is:

1. A bicycle frame assembly comprising:
a head tube for mounting a front fork of a bicycle;
a seat tube for mounting a saddle of the bicycle;
a linking member having a first part, two positioning parts, and two second parts, the first part being connected with the seat tube, the two positioning parts extending toward the head tube from the first part and spaced from each other, a limiting portion being defined between the two positioning parts, the two second parts being connected with the head tube and located between the head tube and the two positioning parts; and
a support holder movably mounted to the limiting portion relative to the linking member for mounting a portable part or accessory;
wherein the support holder comprises at least one portion and an accommodating space defined by the at least one portion in a way that the portable part or accessory is removably positioned in the accommodating space by the at least one portion;
wherein the linking member comprises a fastening piece that is mounted to the first part and adjacent to the limiting portion;
wherein the support holder is movably mounted to the fastening piece in a way that the support holder is movable up and down in a direction that is unparallel to an axial direction of the linking member so as to change a distance that the portable part or accessory protrudes upwardly over the linking member; and
wherein the linking member is integrally formed of one single tube and apposed at the seat tube.

2. The bicycle frame assembly as defined in claim 1, wherein the fastening piece is soldered to the linking member.

3. The bicycle frame assembly as defined in claim 1, wherein the support holder comprises a fastening member, the fastening member abutting against the fastening piece; a positioning member is inserted into a slide slot in the fastening piece for fastening the support holder and the support holder is movable along the slide slot via the positioning member.

4. The bicycle frame assembly as defined in claim 1, wherein each of the two second parts comprises an end portion, and the end portions of the two second parts are spaced from each other and mounted to the head tube.

5. The bicycle frame assembly as defined in claim 1, wherein end portions of the two second parts are separated from each other and mounted to the head tube.

6. The bicycle frame assembly as defined in claim 1, wherein each of the positioning parts protrudes toward an external side of the first part to make the limiting portion hollow.

7. The bicycle frame assembly as defined in claim 1, wherein the support holder comprises two top arc-shaped portions, two first standing portions, two middle arc-shaped portions, two second standing portions, and two bottom portions, the first standing portions being located between the top and middle arc-shaped portions, the second standing portions being located between the middle arc-shaped portions and the bottom portions, the top and middle arc-shaped portions jointly defining the accommodating space having a predetermined height.

* * * * *